United States Patent [19]
Mukai et al.

[11] Patent Number: 6,121,769
[45] Date of Patent: Sep. 19, 2000

[54] METHOD OF AND APPARATUS FOR DETECTING MALFUNCTION OF DISPLACEMENT DETECTOR

[75] Inventors: Yoshinobu Mukai; Yoshiki Noro, both of Saitama-ken, Japan

[73] Assignee: Honda Giken Kogyo Kabushiki Kaisha, Tokyo, Japan

[21] Appl. No.: 09/128,228

[22] Filed: Aug. 3, 1998

[30] Foreign Application Priority Data

Aug. 22, 1997 [JP] Japan ..................................... 9-226469

[51] Int. Cl.⁷ ................. G01B 7/14; G01B 7/00; G01L 1/14; G01L 25/00
[52] U.S. Cl. ................. 324/207.16; 324/207.12; 324/207.19; 324/537; 73/862.331; 702/116
[58] Field of Search ........... 324/207.12, 207.15–207.19, 324/537, 546, 547; 318/432, 656–660; 340/870.35, 870.36; 73/862.331; 702/116

[56] References Cited

U.S. PATENT DOCUMENTS

| | | | |
|---|---|---|---|
| 4,735,271 | 4/1988 | Shimizu | 318/432 X |
| 5,223,830 | 6/1993 | Romes | 324/207.18 X |
| 5,712,563 | 1/1998 | Kawagoe et al. | 324/207.19 |
| 5,721,487 | 2/1998 | Milosevic | 324/207.19 X |
| 5,777,468 | 7/1998 | Maher | 324/207.12 X |

FOREIGN PATENT DOCUMENTS 7-332910  12/1995  Japan .

*Primary Examiner*—Gerard Strecker
*Attorney, Agent, or Firm*—Merchant & Gould P.C.

[57] ABSTRACT

Displacement detector includes a displaceable core, two detecting coils variable in their inductance in response to displacement of the core, and two reference resistances each connected in series with the corresponding detecting coil. Pulse power is supplied to each pair of the series-connected detecting coil and reference resistance, and two transient response voltages across the reference resistances are taken out. Two bottom holding circuits are also provided in corresponding relation to transient response voltages, so that each of the bottom holding circuits detects and holds a smallest or bottom level of the corresponding transient response voltage and thereby provides the bottom voltage as an output voltage. Then, a difference is evaluated between the two output voltages from the bottom holding circuits. When the difference between the two output voltages is below a predetermined value, the displacement detector is determined as malfunctioning due to a short-circuit state between the transient response voltages.

5 Claims, 9 Drawing Sheets

$$VO = VI * e^{-\frac{Rf}{L} * tk}$$

METHOD OF AND APPARATUS FOR DETECTING MALFUNCTION OF DISPLACEMENT DETECTOR

BACKGROUND OF THE INVENTION

1. Field of the Invention

The present invention relates generally to methods of and apparatuses for detecting a malfunction of a displacement detector of the type arranged to prevent its two output voltages from coinciding with each other.

2. Description of the Related Art

In Japanese Patent Laid-open Publication No. HEI-7-332910, the assignee of the present patent application proposed a displacement detector capable of detecting displacement of a given object with high accuracy and sensitivity. The proposed displacement detector will be outlined below with reference to FIGS. 4A, 4B and 4C.

As shown in FIG. 4A, the proposed displacement detector 1 includes a core 3 movable (in arrowed directions X1 and X2) within a detecting coil 2 in response to displacement of a predetermined object of detection. The detecting coil 2 is connected at one end 2a to one end of a pulse power supply 5 and connected at the other end to the other end of the pulse power supply 5 via a reference resistance Rf so as to detect a transient response voltage VO across the reference resistance Rf.

Where an inductance of the detecting coil 2 when the core 3 is in the neutral or center position within the detecting coil 2 is set to a value L and the reference resistance Rf is set to be sufficiently greater than an internal resistance of the detecting coil 2, the internal resistance of the detecting coil 2 can be ignored, and there can be obtained an equivalent circuit of the detector 1 as shown in FIG. 4B. If the inductance L of the detecting coil 2 and the reference resistance Rf, connected in series with each other, are driven by a rising-amplitude portion of the supplied voltage (with a peak value VI) whose half period (T/2) is sufficiently greater than a time constant τ determined by the inductance L and reference resistance Rf (τ=L/Rf), a transient response waveform results as shown in FIG. 4C and a transient response voltage VO after lapse of time tk may be expressed by the following equation:

$$VO = VI * e^{-(Rf/L)*tk} \qquad \text{Equation (1)}$$

If the inductance L of the detecting coil 2 and the reference resistance Rf are driven by a decaying-amplitude portion of the supplied voltage in a condition where the core 3 has moved in the direction X1 by a given amount with the inductance L of the detecting coil 2 decreased by an amount ΔL (namely, L−ΔL), a transient response voltage VO1 after lapse of time tk may be expressed by the following equation:

$$VO1 = VI * e^{-(Rf/L - \Delta L)*tk} \qquad \text{Equation (2)}$$

The inductance variation amount ΔL, corresponding to the displacement of the core 3 in the X1 direction, may be expressed by Equation (3) below after calculating the inductance L from the transient response voltage VO (Equation (1)) when the core 3 is in the center position within the detecting coil 2 (presenting no displacement) and calculating the inductance (L−ΔL) from the transient response voltage VO1 (Equation (2)) when the core 3 has displaced in the X1 direction by the given amount:

$$\Delta L = Rf * tk \{ \ln^{-1}(VO1/VI) - \ln^{-1}(VO/VI) \} \qquad \text{Equation (3)}$$

Assuming that the time tk is fixed, the inductance variation amount ΔL for the displacement of the core 3 in the X1 direction will correspond to a ratio between the transient response voltage VO or VO1 and the peak value VI of the supplied power from the supply 5. Thus, the inductance variation amount ΔL can be determined independently of the peak value VI and frequency f (1/T) of the supplied power from the supply 5, and the displacement amount in the X1 direction can be determined from the thus-determined inductance variation amount ΔL. The displacement amount in the X1 direction can also be determined by detecting the transient response voltages VO and VO1 because the inductance variation amount ΔL corresponds to the voltages VO and VO1.

Whereas determination of the displacement amount in the X1 direction has been described above in relation to the case where the inductance L of the detecting coil 2 and the reference resistance Rf are driven by the decaying-amplitude portion of the supplied voltage from the supply 5, the displacement amount in the X1 direction can also be determined by detecting transient response voltages corresponding to the voltages VO and VO1 in a situation where the inductance L of the detecting coil 2 and the reference resistance Rf are driven by the rising-amplitude portion of the supplied voltage.

FIGS. 5A and 5B show a displacement detector provided with two detecting coils and an equivalent circuit of the displacement detector. In FIG. 5A, the displacement detector 10 includes a displacement sensor 11, a pulse power supply 15 and two reference resistances Rf. The displacement sensor 11 includes a core 13 displaceable in opposite directions (upward and downward in the figure), and first and second detecting coils 12A and 12B disposed symmetrically along the displacement directions of the core 13 so that their inductances vary in a differential manner. The first detecting coil 12A has one end 12a connected to one end of one of the reference resistances Rf and another end 12b connected with one end 12c of the second detecting coil 12B. Further, the second detecting coil 12B is connected at the other end 12d to one end of the other reference resistance Rf, and the other ends of the two reference resistances Rf are connected with each other and grounded. The pulse power supply 15 (with a peak value VI) is coupled to junctions between the ends 12b and 12c of the first and second detecting coils 12A and 12B and between the two reference resistances Rf, so that a voltage generated across one of the resistances Rf is taken out at a first detecting terminal S1 while a voltage generated across the other resistances Rf is taken out at a second detecting terminal S2.

As shown in FIG. 5B, the equivalent circuit of the displacement detector 10 of FIG. 5A comprises a bridge circuit 14 that includes inductances L1 and L2 of the above-mentioned detecting coils 12A and 12B and two reference resistances Rf. Power from the pulse power supply 15 is supplied to the bridge circuit 14 so as to take out transient response voltages VS1 and VS2 at detecting terminals S1 and S2. Potential difference VD between the detecting terminals S1 and S2 (hereinafter called a "detected voltage") equals a difference between the two transient response voltages VS1 and VS2 (VS1−VS2).

FIGS. 6A and 6B are waveform diagrams of the transient response voltages produced in the displacement detector of FIG. 5A; FIG. 6A shows a transient response voltage waveform where the rising and decaying wave segments of the supplied pulse power are equal to each other in time length, while FIG. 6B shows a transient response voltage waveform where the rising and decaying wave segments of the supplied pulse power are different from each other in time length. In the example of FIG. 6A, the time length (T/2)

of each decaying wave segment is set to be sufficiently longer than a time constant of an integrator circuit, composed of the inductances L1 and L2 of the detecting coils and the reference resistances Rf, so that the transient response voltages reach zero volt at time T/2. In contrast, the time length (T1) of each decaying wave segment in FIG. 6B is set to be shorter so that the transient response voltages do not reach zero volt at time T1. In each of the examples of FIGS. 6A and 6B, however, the time length of each rising wave segment is set to be sufficiently longer than the time constant of the integrator circuit so that the transient response voltages reach the peak value V1 at time T or T2.

Consider, for example, a case where the core 13 of the displacement sensor 11 in the displacement detector 10 of FIG. 5A is displaced by a given amount in the X1 direction from the center position (exactly between the two detecting coils 12A and 12B), in accordance with which the inductance L (i.e., inductance at the center position) of the first detecting coil 12A has decreased to L1 while the inductance L of the second detecting coil 12B has increased to L2. In this case, the time constant of the transient response voltage VS1 taken out at the detecting terminal S1 (L1/Rf) becomes smaller than that of the transient response voltage VS2 at the detecting terminal S2 (L2/Rf), due to the relationship of L1<L2. Thus, the rise and fall time of the transient response voltage VS1 will be shorter than those of the transient response voltage VS2, as shown in FIGS. 6A and 6B.

When the core 13 is displaced in the X1 direction, the detected voltage VD between the detecting terminals S1 and S2 (=VS1−VS2) assumes a negative (minus) polarity during each decaying time of the supplied pulse power but assumes a positive (plus) polarity during each rising time Conversely, when the core 13 is displaced in the X2 direction, the detected voltage VD between the detecting terminals S1 and S2 assumes a positive polarity during each decaying time of the supplied pulse power but assumes a negative polarity during each rising time. In this way, the displacement amount in the X1 or X2 direction can be determined from the absolute value of the detected voltage VD, and the displacement direction can be determined from the polarity of the detected voltage VD.

Where the displacement detector is arranged in such a manner that the detected voltage VD is determined during the decaying time of the supplied pulse power, the maximum absolute value of the detected voltage VD (negative polarity) can be detected at a time point tM in the example of FIG. 6A and at a time point T1 in the example of FIG. 6B. Note that the same maximum absolute value of the detected voltage VD (negative polarity) can also be detected in the example of FIG. 6B by setting the time T1 to coincide with the time tM. Thus, even with the same maximum displaceable amount of the displacement sensor 11, a highly sensitive displacement detector 10 is achieved, by just setting detection timing and fall time of the supplied pulse power such that the maximum value of the detected voltage VD can be determined.

FIG. 7 is a block diagram of a torque detector employing the displacement detector as shown in FIG. 5A, and FIGS. 8A, 8B, 8C, 8D, 9A and 9B are waveform diagrams explanatory of behavior of the torque detector shown in FIG. 7. As shown in FIG. 7, the torque detector 40 generally comprises a torque sensor body 41 using the displacement detector of FIG. 5A, and a torque detecting unit 46. The torque sensor body 41 includes an input shaft 42, an output shaft 43, a torsion bar (not shown) interconnecting the input and output shafts 42 and 43, an axially-movable core 44, first and second detecting coils 45A and 45B, and two reference resistances (not shown) that are similar to the reference resistances Rf of FIG. 5A.

As torque is applied to the input and output shafts 42 and 43, a torsional angle proportional to the applied torque is produced in the torsion bar. This torsional angle is converted into an axial displacement of the core 44, by cooperation between a pin (not shown) coupled to both the shafts 42 and 43 and spiral and vertical grooves (not shown) formed in the core 44. The axial displacement of the core 44 is detected as inductance variations (ΔLT) of the first and second detecting coils 45A and 45B, and the inductance variations (ΔLT) are determined from transient response voltages VS1 and VS2 that result from a pulse voltage VI supplied to a bridge circuit composed of the detecting coils 45A and 45B and the two reference resistances.

The torque detecting unit 46 includes a pulse generator circuit 51 for supplying the pulse voltage VI to the torque sensor body 41, low-pass filters 47A and 47B for eliminating high-frequency switching noise from the transient response voltages VS1 and VS2, output from the sensor body 41, to thereby provide noise-eliminated transient response voltages Va1 and Va2, and bottom holding transient response voltages Va1 and Va2, and bottom holding circuits (48A, 458B) for temporarily holding respective bottom voltages VT1 and VT2 (e.g., voltage values at the time point T1 of FIG. 6B) of the transient response voltages Va1 and Va2. The torque detecting unit 46 further includes a differential amplifier 49 for calculating a difference between the bottom voltages VT2 and VT1 (VT2−VT1) and amplifying the calculated difference by a gain G1 to provide a difference voltage Vb, and an inverter amplifier 50 for inverting the difference voltage Vb and shifting the inverted difference voltage Vb by a reference voltage value (e.g., 2.5 volts) to thereby provide a torque detecting voltage VT.

FIG. 8A shows a waveform of the pulse voltage VI output from the pulse generator circuit 51, and FIG. 8B shows respective waveforms of the transient response voltages VS1 and VS2 output from the bridge circuit of the sensor body 41. The waveforms of the transient response voltages VS1 and VS2 contain switching noise. FIG. 8C shows respective waveforms of the noise-eliminated transient response voltages Va1 and Va2 passed through the low-pass filters 47A and 47B, and FIG. 8D shows waveforms of the bottom voltages VT1 and VT2.

Further, FIG. 9A shows a waveform of the difference voltage Vb obtained by amplifying the difference between the bottom voltages VT2 and VT1 (VT2−VT1) by the gain G1. FIG. 9B shows a waveform of the torque detecting voltage VT obtained by inverting the difference voltage Vb and shifting the inverted difference voltage Vb by the reference voltage value (e.g., 2.5 volts). The torque detecting voltage VT is maintained at the reference voltage of 2.5 volts when no torque is applied, but as torque is applied, it varies linearly in accordance with the direction and magnitude of the applied torque.

The torque detector 40 shown in FIG. 7 is capable of converting the inductance variations of the first and second detecting coils 45A and 45B into voltage variations to thereby provide two output voltages (bottom voltages) VT1 and VT2, and it is arranged to prevent the output voltages (i.e., bottom voltages) VT1 and VT2 from coinciding with each other over a predetermined operating range (i.e., torque detecting range) of the torque detector 40 (see FIG. 9A).

Examples of the conventional control devices, intended for performing various control on the basis of torque detected by such a torque detector arranged to prevent the output voltages (bottom voltages) VT1 and VT2 from coinciding with each other as mentioned, include the electric power steering apparatus for detecting manual steering torque via the torque detector to control a steering assist from an electric motor in accordance with the detected manual steering torque. When the output voltages (bottom voltages) VT1 and VT2 get out of a predetermined voltage range, such conventional control devices determine that the torque detector is malfunctioning and stop their control operation. Also, when the sum or average of the output voltages (bottom voltages) VT1 and VT2 departs from or gets out of a predetermined voltage range, the control devices determine that the torque detector is malfunctioning and stop their control operation.

For example, with the torque detector where the allowable voltage range of the output voltages (bottom voltages) VT1 and VT2 in normal conditions is 0.2–4.8 volts and which is arranged in such a manner that the average of the voltages VT1 and VT2 is generally maintained at 2.5 volts, the conventional control devices determines the torque detector as malfunctioning when any one of the following conditions is detected:

(1) one of the output voltages (bottom voltages) VT1 and VT2 is not greater than 0.2 volts;

(2) one of the output voltages VT1 and VT2 is not smaller than 4.8 volts;

(3) the average of the output voltages VT1 and VT2, i.e., (VT1+VT2)/2, is not greater than 2 volts; and (4) the average of the output voltages VT1 and VT2 is not smaller than 3 volts.

However, the conventional control devices, which are arranged to detect a malfunction of the torque detector on the basis of the preset allowable voltage ranges of the individual output voltages VT1 and VT2, their sum and their average, can not detect when the output voltages (bottom voltages) VT1 and VT2 are brought into a "short-circuit" state. For example, the conventional control devices employing the torque detector of FIG. 7 can not detect when the transient response voltages VS1 and VS2 pass into a short-circuit state in a connector CN1 of the sensor body 41, in a connector CN2 of the torque detecting unit 46 or in a cable CA interconnecting the connectors CN1 and CN2, because the output voltages (bottom voltages) VT1 and VT2 from the detecting unit 46 would both amount to about 2.5 volts (VT1=VT2=2.5 volts).

SUMMARY OF THE INVENTION

It is therefore an object of the present invention to provide a method of and apparatus for detecting a malfunction of a displacement detector arranged to prevent its two output voltages from coinciding with each other, which is capable of detecting an unwanted short-circuit state between the two output voltages.

According to an aspect of the present invention, there is provided a method of detecting a malfunction of a displacement detector which includes a displaceable core, two detecting coils variable in inductance in response to displacement of the core and two converters for converting variations of the inductance of the two detecting coils into variations of voltage and arranged to prevent output voltages of the two detecting coils from coinciding with each other over a normal operating range of the displacement detector. The method comprises the steps of: evaluating a difference between output voltages from the converters; and determining the displacement detector as malfunctioning, when the difference between output voltages is below a predetermined value. With this arrangement, the method can accurately detect when a short-circuit state occurs between the two output voltages that are representative of a displacement of a given object detected by the detector.

The principle of the present invention can also be embodied as an apparatus for detecting a malfunction of such a displacement detector, which comprises: a section for evaluating a difference between output voltages from the two converters; and a section for determining the displacement detector as malfunctioning, when the difference between output voltages is below a predetermined value.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

The following description is merely exemplary in nature and is in no way intended to limit the invention or its application or uses.

Figure 1:
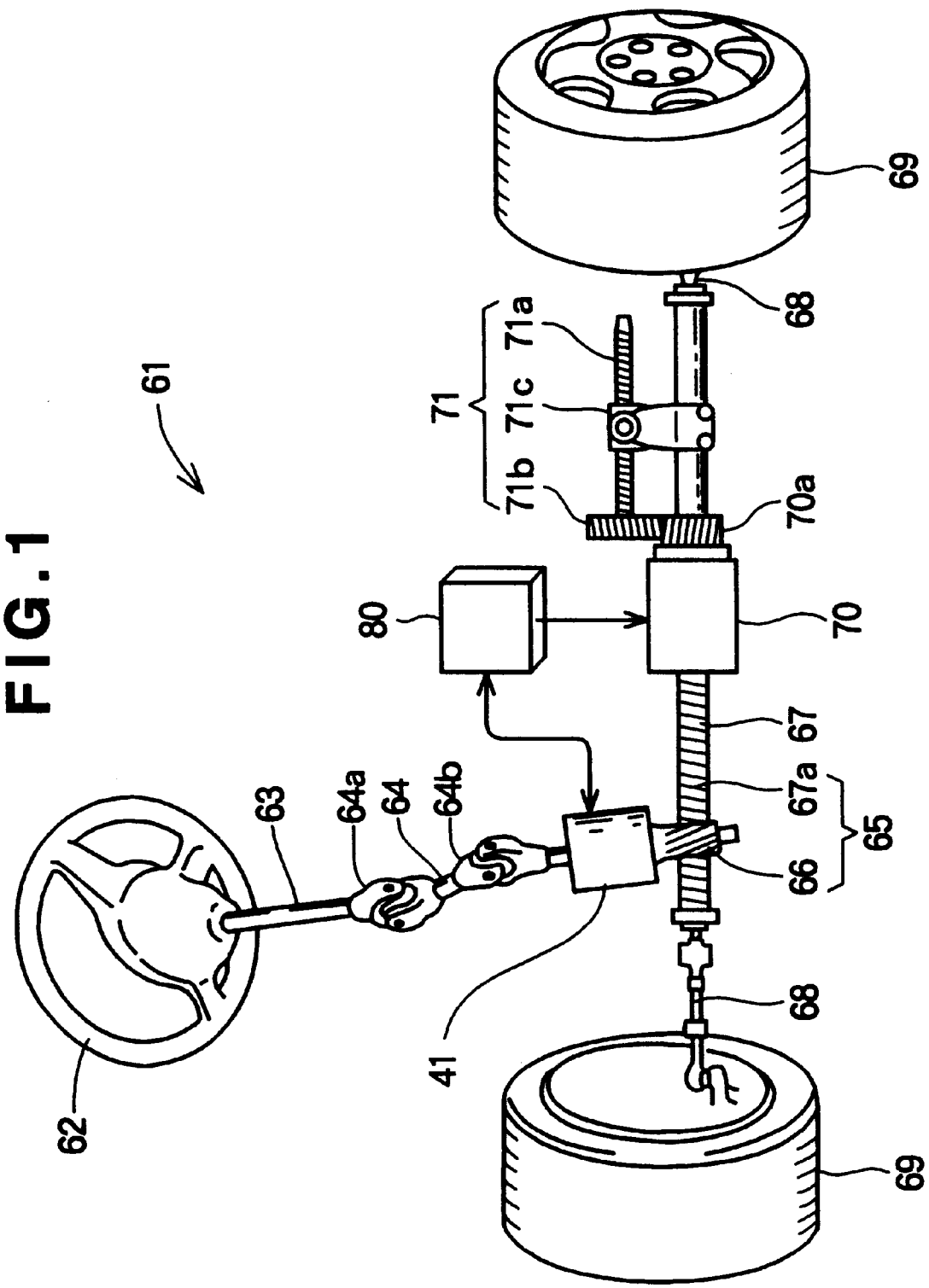
FIG. 1 is a block diagram showing an exemplary general setup of an electric power steering apparatus for use with an automotive vehicle, which employs a torque detector and to which the principle of the present invention is applied.

Initial reference is made to the block diagram of FIG. 1, showing an exemplary general setup of an electric power steering apparatus 61 for use with an automotive vehicle, which employs a torque detector and to which the principle of the present invention is applied. The electric power steering apparatus 61 includes an electric assisting motor 70 provided in the vehicle steering system that is controlled by a control unit 80 to apply a controlled steering assist to a manual steering effort by a vehicle driver. In the electric power steering apparatus 61, a steering shaft 63 that is integrally connected at one end to a steering wheel 62 and connected at the other end, via a connecting shaft 64 having universal joints 64a and 64b, to a pinion 66 of a rack-and-pinion steering gear mechanism 65 enclosed within a steering gear box. Rack shaft 67 of the steering gear mechanism 65 has teeth 67a meshing with the pinion 66, so that rotary movements of the steering shaft 62 and pinion 66 are converted into linear reciprocating movements of the toothed rack shaft 67 that is connected to steered left and right front wheels 69 via tie rods 68. Manually turning the steering wheel 62 causes the steered left and right front wheels 69 to pivot via the rack-and-pinion steering gear mechanism 65 and tie rods 68, so that the traveling direction of the vehicle can be changed as desired by the vehicle driver.

To reduce a vehicle driver's steering effort, the assisting motor 70 is provided coaxially with the rack shaft 67, so that an electric steering assist from the motor 70 is converted via a ball thread mechanism 71, parallel with the rack shaft 67, into thrust acting on the rack shaft 67. Driving helical gear 70a, which is connected to the rotor of the assisting motor 70, meshes with a driven helical gear 71b secured to one end of a threaded shaft 71a of the ball thread mechanism 71.

The torque detector 40, which is provided for detecting manual steering torque applied to the pinion 66, includes a torque sensor body 41 contained in a steering box (not shown) and a torque detecting unit 46 provided in the control unit 80. The control unit 80 controls the operation of the assisting motor 70 on the basis of a signal VT representative of steering torque detected by the torque detector 40 (torque detection signal).

Figure 2:
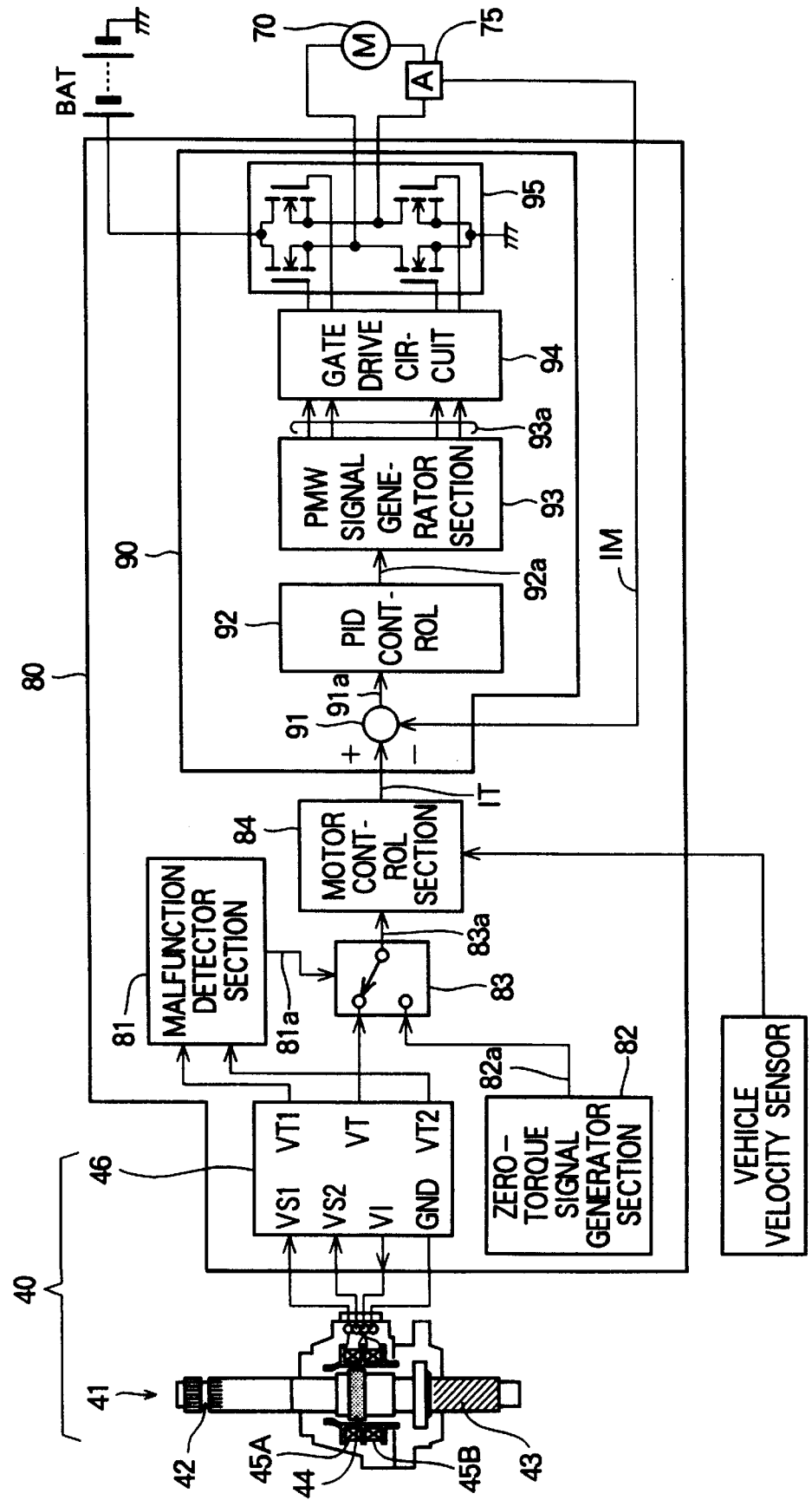
FIG. 2 is a block diagram showing an exemplary detailed hardware setup of a control unit shown in FIG. 1.
Figure 7:
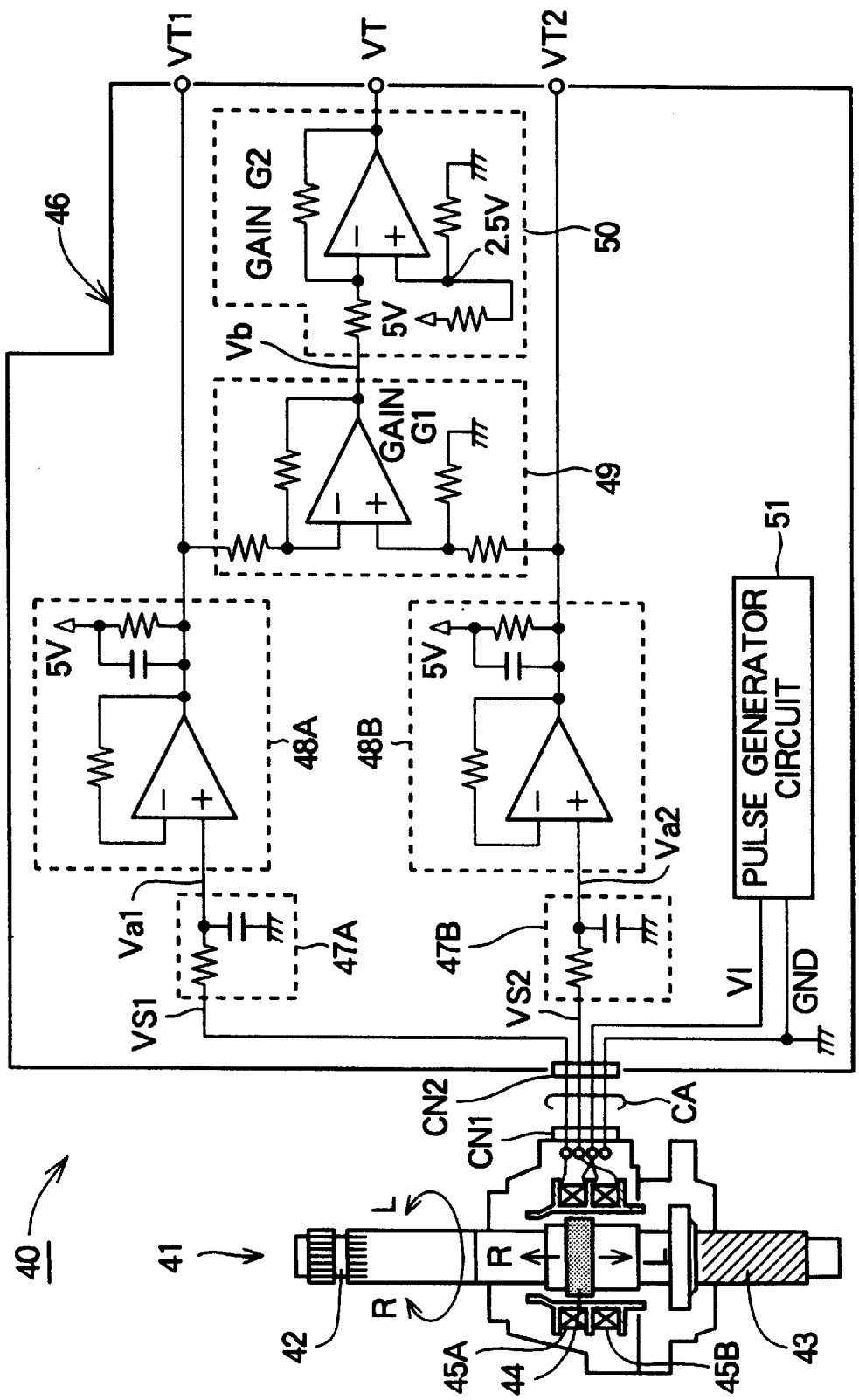
FIG. 7 is a block diagram of a torque detector employing the displacement detector shown in FIG. 5A.
Figure 8A:
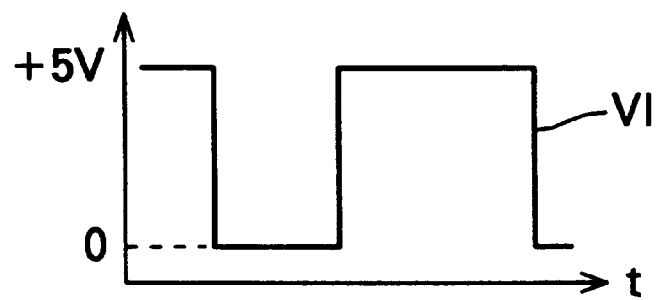
FIGS. 8A, 8B, 8C and 8D are waveform diagrams explanatory of behavior of the torque detector shown in FIG. 7.
Figure 8B:
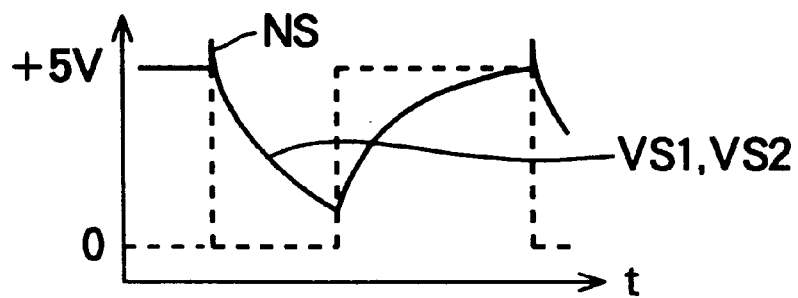
Figure 8C:
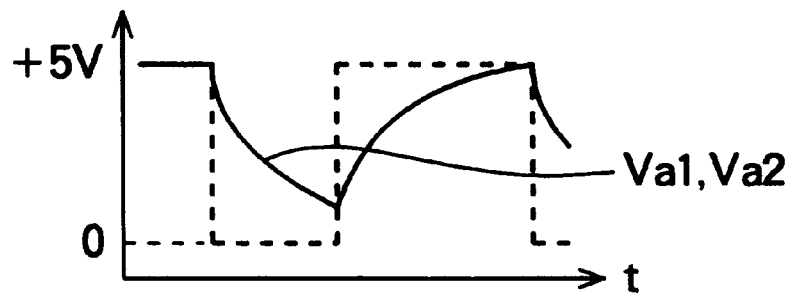
Figure 8D:
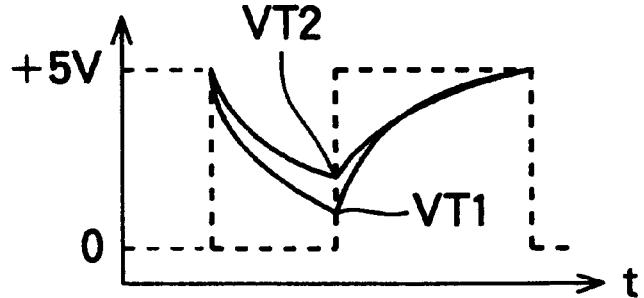
Figure 9A:
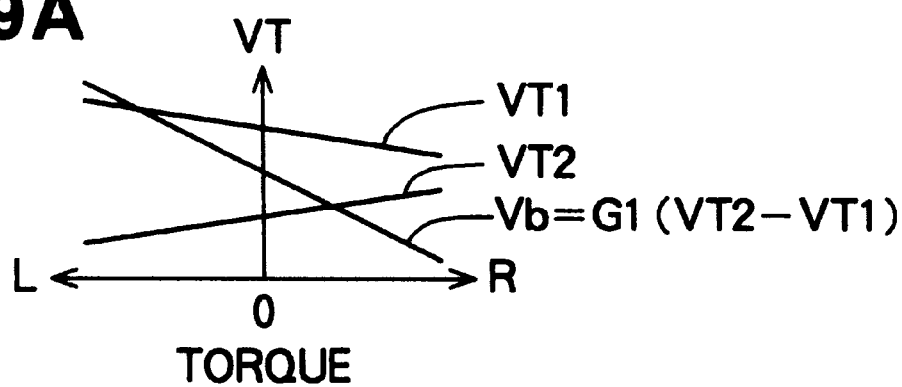
FIGS. 9A and 9B are also waveform diagrams explanatory of behavior of the torque detector shown in FIG. 7.
Figure 9B:
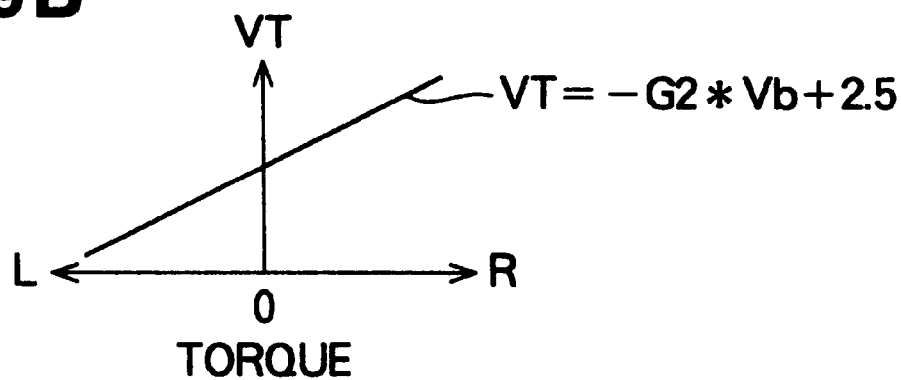

FIG. 2 is a block diagram showing an exemplary detailed hardware setup of the control unit 80 shown in FIG. 1. As shown, the control unit 80 includes the above-mentioned torque detecting unit 46, a malfunction detector section 81 for detecting an unusual operation or malfunction of the torque detector 40, a zero-torque signal generator section 82 for generating a voltage signal 82a when no torque is applied, a torque signal selector section 83, a motor control section 84, and a motor drive 90. In FIG. 2, reference character BAT represents a battery as a power supply, and 75 represents a motor current detector for detecting a current flowing through the assisting motor 70 to output a motor current signal IM. The sensor body 41 and torque detecting unit 46 of the torque detector 40 are identical in construction and operation to those described earlier in relation to FIG. 7 and will not be described in detail herein to avoid unnecessary duplication.

The malfunction detector section 81 constantly monitors two separate output voltages (bottom voltages) VT1 and VT2 from the torque detecting unit 46 in order to see whether or not the torque detector 40 is functioning properly. When the output voltages (bottom voltages) VT1 and VT2 passes into any one of the following conditions, the malfunction detector section 81 determines the torque detector 40 as malfunctioning and outputs a signal representative of the malfunction (malfunction detection signal) 81a.

First, when one of the output voltages (bottom voltages) VT1 and VT2 departs from or gets out of a preset voltage range, the malfunction detector section 81 determines the torque detector 40 as malfunctioning and outputs a malfunction detection signal 81a. Specifically, where the allowable voltage range of each of the output voltages (bottom voltages) VT1 and VT2 in a normal operating condition of the detector 40 is chosen to be 0.2–4.8 volts, the malfunction detector section 81 outputs a malfunction detection signal 81a once one of the output voltages VT1 and VT2 gets out of the range of 0.2–4.8 volts.

Second, when the sum or average of the two output voltages (bottom voltages) VT1 and VT2 gets out of a preset voltage range, the malfunction detector section 81 determines the torque detector 40 as malfunctioning and outputs a malfunction detection signal 81a. For example, where the allowable average voltage range in the normal operating condition of the detector 40 is set to around 2.5 volts, the malfunction detector section 81 outputs a malfunction detection signal 81a once the average of the output voltages VT1 and VT2 becomes not greater than 2 volts or not smaller than 3 volts.

Third, when the absolute value of a difference between the two output voltages (bottom voltages) VT1 and VT2 (i.e., |VT1−VT2|) falls below a preset minimum value, the malfunction detector section 81 determines the torque detector 40 as malfunctioning and outputs a malfunction detection signal 81a. For example, where the minimum value in the normal operating condition of the detector 40 is set to 0.2 volts, the malfunction detector section 81 outputs a malfunction detection signal 81a once the absolute value of the difference between the two output voltages (bottom voltages) VT1 and VT2 (|VT1−VT2|) falls below 0.2 volts.

Fourth, when the absolute value of a difference between the two output voltages (bottom voltages) VT1 and VT2 (i.e., |VT1−VT2|) falls above a preset maximum value, the malfunction detector section 81 determines the torque detector 40 as malfunctioning and outputs a malfunction detection signal 81a. For example, where the maximum value in the normal operating condition of the detector 40 is set to 4 volts, the malfunction detector section 81 outputs a malfunction detection signal 81a once the absolute value of the difference between the two output voltages (bottom voltages) VT1 and VT2 (|VT1−VT2|) falls above 4 volts.

Figure 3:
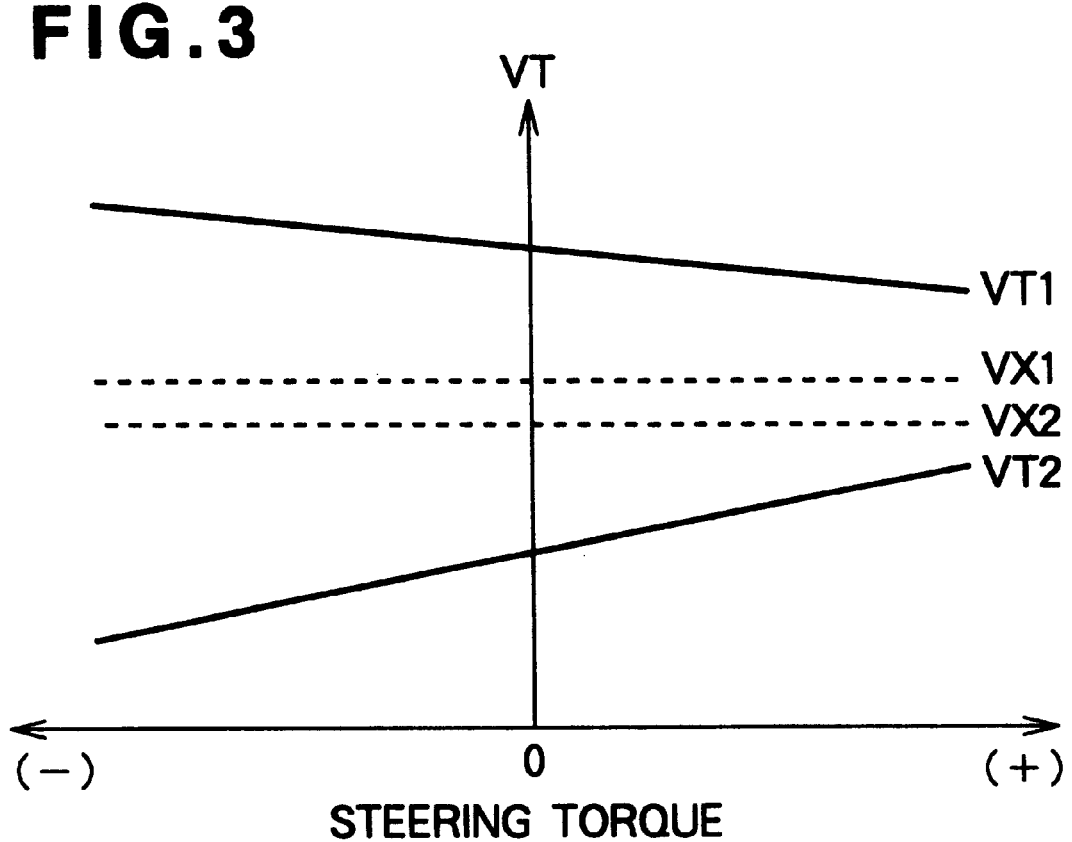
FIG. 3 is a diagram explanatory of a short-circuit state between two output voltages (bottom voltages) shown in FIG. 2.
Figure 4A:
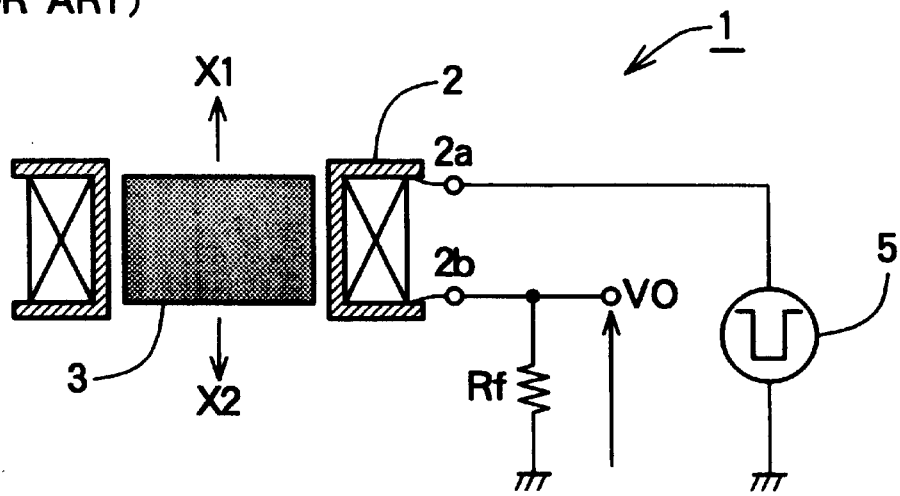
FIGS. 4A, 4B and 4C are diagrams showing a basic structure, equivalent circuit and operation, respectively, of a conventional displacement detector.
Figure 4B:
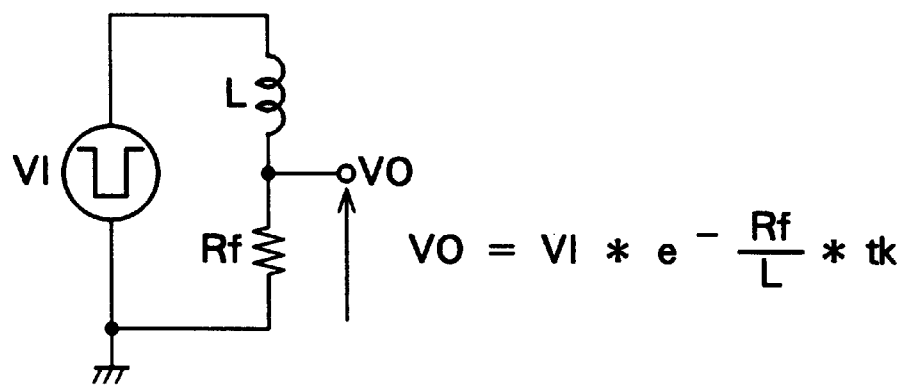
Figure 4C:
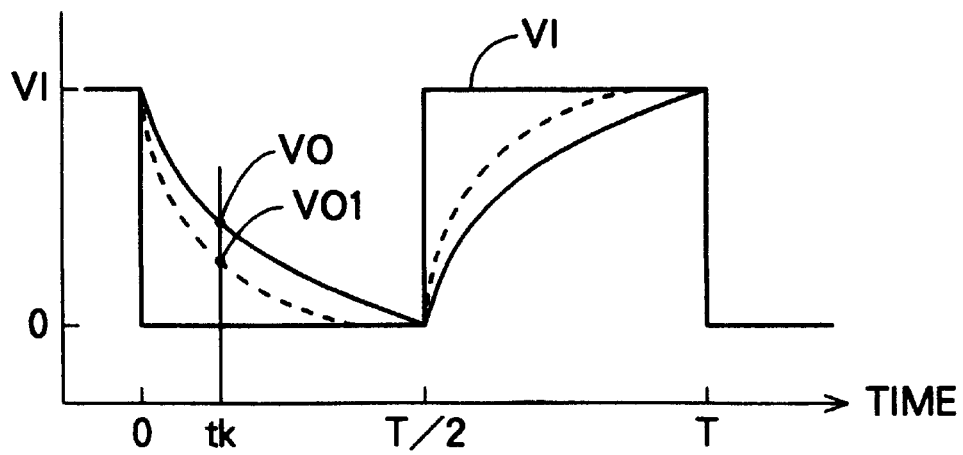
Figure 5A:
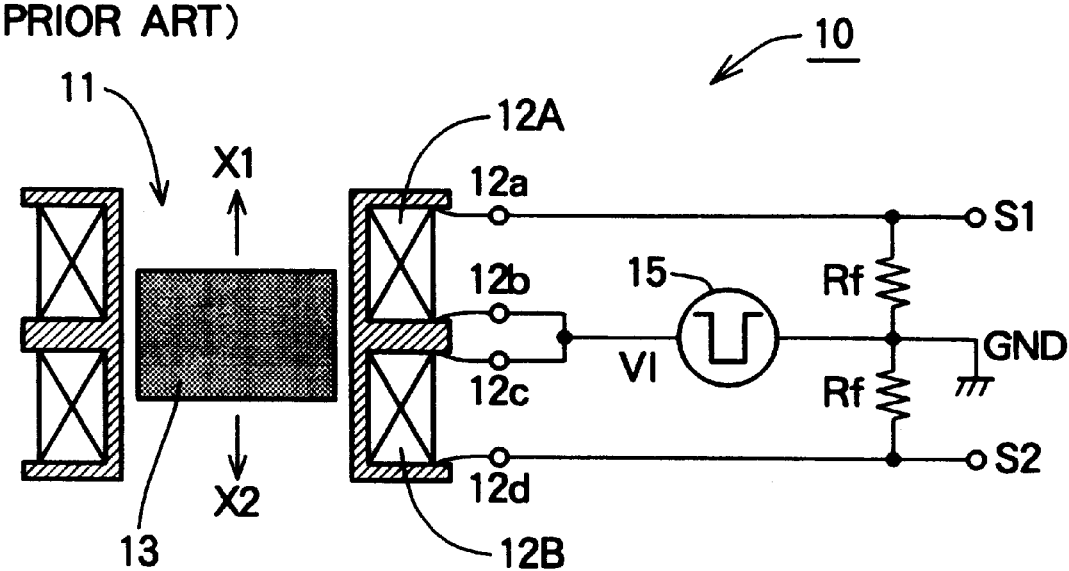
FIGS. 5A and 5B are diagrams showing a structure and equivalent circuit, respectively, of another conventional displacement detector.
Figure 5B:
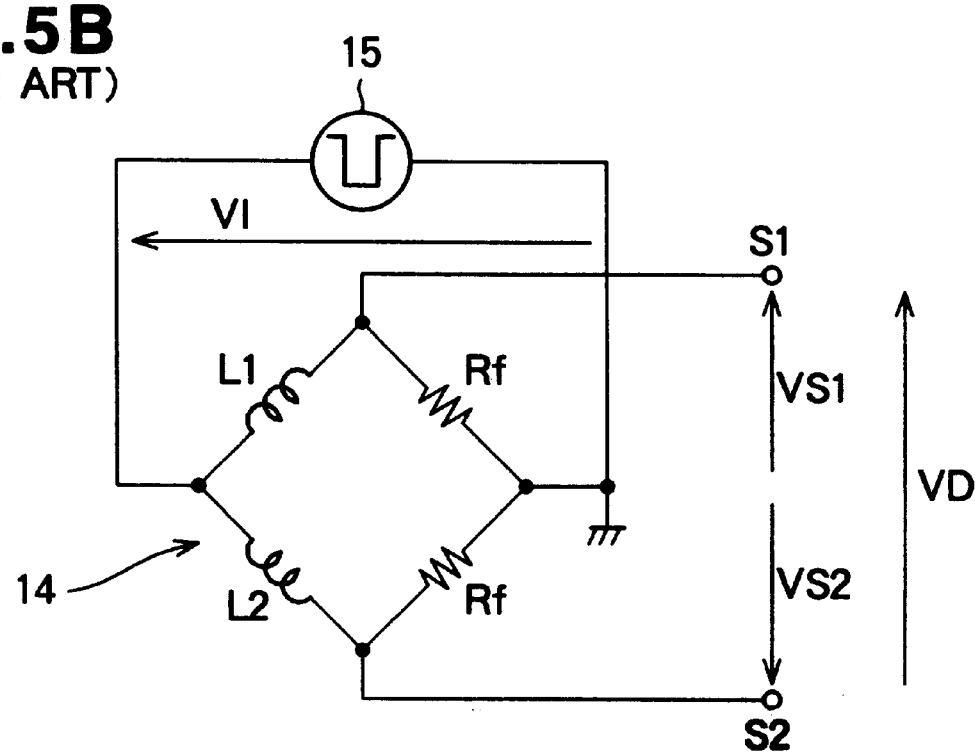
Figure 6A:
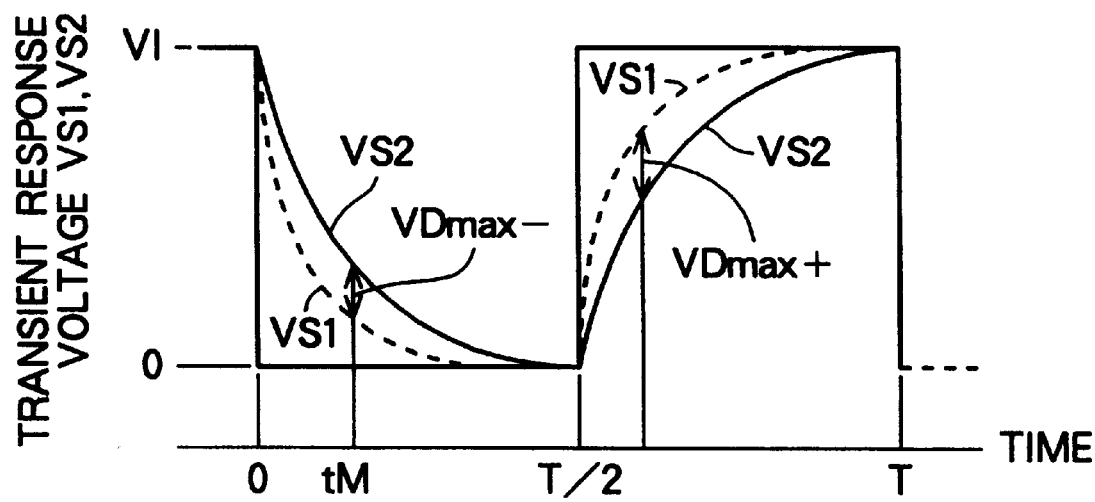
FIGS. 6A and 6B are waveform diagrams of transient response voltages produced in the displacement detector of FIG. 5A.
Figure 6B:
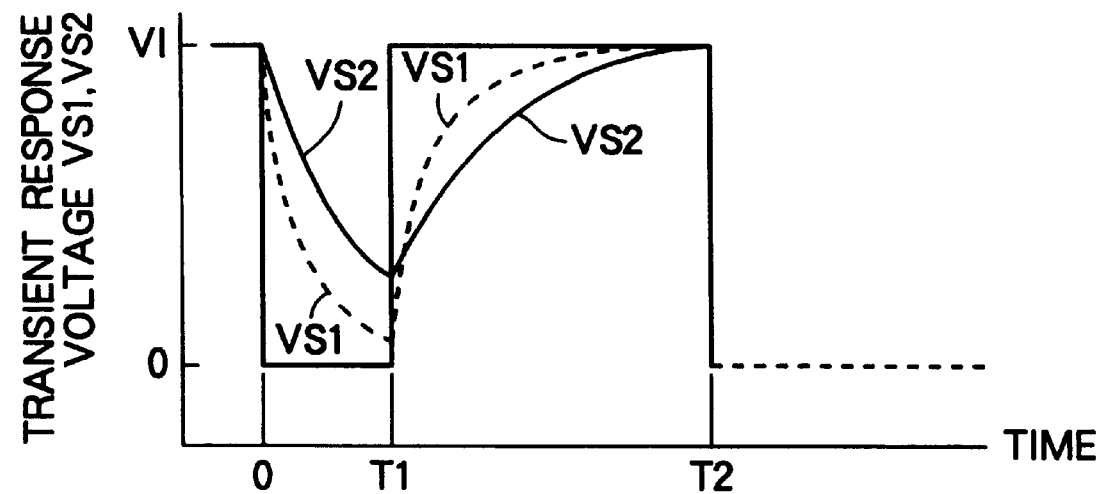

FIG. 3 is a diagram explanatory of a short-circuit state between the two output voltages (bottom voltages) VT1 and VT2 from the torque detecting unit 46. As the two output voltages VT1 and VT2 pass from a normal state into a short-circuit state, the voltages VT1 and VT2 fall within a range between levels or values VX1 and VX2 smaller than the voltage VT1 but greater than the voltage VT2 and eventually take a same value. As a result, the difference between the two output voltages VT1 and VT2 becomes substantially zero, from which the malfunction detector section 81 can detect the short-circuit state or virtual coincidence between the two output voltages VT1 and VT2.

Referring back to FIG. 2, the zero-torque signal generator section 82 generates a voltage signal 82a representing a zero-torque condition, which is delivered to the torque signal selector section 83. In the absence of the malfunction detection signal 81a from the malfunction detector section 81, the torque signal selector section 83 selects and passes the torque detection signal VT from the torque detecting unit 46 to the motor control section 84. When the malfunction detection signal 81a is received from the malfunction detector section 81, however, the torque signal selector section 83 selects and passes the zero-torque voltage signal 82a to the motor control section 84.

On the basis of a torque signal (a voltage signal corresponding to torque) 83a passed from the torque signal selector section 83, the motor control section 84 determines a value of a motor current that is to be supplied to the motor 70 for generating a steering assist corresponding to the current steering torque. Also, the motor control section 84 modifies the motor current value, in accordance with a vehicle velocity detected by a vehicle velocity sensor 85, to thereby provide a target motor current and outputs a signal IT representative of the target motor current.

The motor drive 90 includes an offset calculating section 91, a PID (Proportional, Integral and Differential) control 92, a PWM (Pulse-Width-Modulated) signal generator section 93, a gate drive circuit 94, and a motor drive circuit 95 having four FETs (Field Effect Transistors) connected to form an H-shaped bridge.

The offset calculating section 91 calculates an offset between the target motor current IT and the actual motor current IM detected by the motor current detector 75 and outputs an offset signal 91a that is then fed to the PID control 92. The PID control 92 carries out proportional, integral and differential operations, etc. on the offset signal 91a to thereby generate a drive control signal 92a for controlling the current, to be supplied to the assisting motor 70, such that the offset approaches zero. The control signal 92a is delivered to the PWM signal generator section 93.

On the basis of the control signal 92a from the PID control 92, the PWM signal generator section 93 generates a PWM (Pulse-Width-Modulated) signal 93a for controlling the assisting motor 70 using the known PWM control scheme. The thus-generated PWM signal 93a is fed to the gate drive circuit 94, which, on the basis of the PWM signal 93a, drives the gate of each of the FETs.

As described above, the control unit 80 PWM-controls the electric power, to be supplied from the battery BAT to the assisting motor 70, in accordance with the steering torque detected by the torque detector 40 and thereby controls the output power (steering assist) from the motor 70. Further, the malfunction detector section 81 in the control unit 80 monitors the operation of the torque detector 40 on the basis of the output voltages (bottom voltages) VT1 and VT2, so that upon detection of an unusual operation, i.e., malfunction of the detector 40, it outputs a malfunction detection signal 81a to the torque signal selector section 83 so as to prevent a torque detection signal VT from the torque detector 40 from being passed to the motor control section 84. In this case, a zero-torque voltage signal 82a is also sent to the motor control section 84 to prevent generation of a steering assist from the motor 70.

Further, the malfunction detector section 81 has been described as detecting a malfunction of the torque detector 40 by monitoring the absolute value of a difference between the output voltages VT1 and VT2, in addition to the conventional malfunction detection based on the allowable ranges of the individual output voltages VT1 and VT2 and of the sum or average of the two output voltages VT1 and VT2. By thus monitoring the absolute value of a difference between the output voltages VT1 and VT2, the control unit 80 can detect a short-circuit state between the output voltages VT1 and VT2. As a result, it is possible to avoid the inconvenience that a malfunction of the torque detector 40 prevents accurate detection of manual steering torque and thereby deteriorates the steering feel.

Alternatively, the principle of the present invention may be applied to cases where there are provided two torque detectors 40 each comprising the sensor body 41 and torque detecting unit 46 and the malfunction detector section 81 monitors the operation of the two torque detectors 40. Upon detection of a malfunction of one of the torque detectors 40, a torque detection signal VT from the other torque detector 40 is passed to the motor control section 84, so as to provide for continued generation, from the motor 70, of a steering assist corresponding to manual steering torque. In the event the torque detectors 40 both get out of order, a zero-torque representing voltage signal 82a may be sent to the motor control section 84 so as to cause the motor 70 to discontinue the steering assist generation.

Further, in the above-described control unit 80 of FIG. 2, there are provided the zero-torque signal generator section 82 and torque signal selector section 83 so that when the torque detector 40 is malfunctioning, the zero-torque voltage signal 82a is passed directly to the motor control section 84 so as to stop the steering assist generation by the assisting motor 70. Alternatively, upon detection of a malfunction of the torque detector 40, the steering assist generating operation of the assisting motor 70 may be discontinued by passing the malfunction detection signal 81a directly to the motor control section 84 and setting the target motor current IT to a value of zero. In another alternative, the malfunction detection signal 81a may be passed directly to the motor drive 90 so that the drive 90 discontinues the steering assist generating operation of the assisting motor 70 upon detection of a malfunction of the torque detector 40.

Finally, whereas the present invention has been described above in relation to the transient-response-voltage-type torque detector 40, it can of course be applied to differential-transformer-type displacement detectors.

Obviously, various minor changes and modifications of the present invention are possible in the light of the above teaching. It is therefore to be understood that within the scope of the appended claims the present invention may be practices otherwise than as specifically described.

What is claimed is:

1. A method of detecting a malfunction of a displacement detector, said displacement detector including a displaceable core, two detecting coils variable in inductance in response to displacement of the core and two converters for converting variations of the inductance of the two detecting coils into variations of voltage and being arranged to prevent output voltages of the two detecting coils from coinciding with each other over a normal operating range of said displacement detector, said method comprising the steps of:

evaluating a difference between output voltages from said converters; and determining said displacement detector as malfunctioning due to a short-circuit state occurring between the output voltages of the detecting coils, when an absolute value of the difference between output voltages is below a predetermined value.

2. A method as recited in claim 1 wherein said displacement detector is a torque detector that includes an input shaft, an output shaft, and a torsion bar interconnecting the input and output shafts, and wherein the core of said torque detector engages with said input and output shafts and is displaceable in response to steering torque acting on said input and output shafts.

3. A method as recited in claim 1 wherein said displacement detector further includes two reference resistances each connected in series with a corresponding one of said detecting coils, and a pulse power supply for supplying pulse power to each pair of the detecting coil and the reference resistance connected in series, and wherein said displacement detector detects a transient response voltage across each of said reference resistances.

4. A method as recited in claim 1 wherein said displacement detector further includes two reference resistances each connected in series with a corresponding one of said detecting coils, said two reference resistances and said two detecting coils being connected to form a bridge circuit, and a pulse power supply for supplying pulse power to said bridge circuit, and wherein said displacement detector detects a transient response voltage across each of said reference resistances.

5. An apparatus for detecting a malfunction of a displacement detector, said displacement detector including a displaceable core, two detecting coils variable in inductance in response to displacement of the core and two converters for converting variations of the inductance of the two detecting coils into variations of voltage and being arranged to prevent output voltages of the two detecting coils from coinciding with each other over a normal operating range of said displacement detector, said apparatus comprising:

a section for evaluating a difference between output voltages from said converters; and a section for determining said displacement detector as malfunctioning due to a short-circuit state occurring between the output voltages of the detecting coils, when an absolute value of the difference between output voltages is below a predetermined value.

* * * * *